United States Patent [19]

Kasagi et al.

[11] Patent Number: 5,204,788
[45] Date of Patent: Apr. 20, 1993

[54] DIGITAL MAGNETIC RECORDING AND REPRODUCING CIRCUIT FOR SUPPRESSING GENERATION OF ASYMMETRY

[75] Inventors: Yasuhide Kasagi, Fukushima; Keiichi Nishikawa; Yuzou Maruta, both of Kanagawa, all of Japan

[73] Assignee: Mitsubishi Denki Kabushiki Kaisha, Japan

[21] Appl. No.: 714,643

[22] Filed: Jun. 13, 1991

[30] Foreign Application Priority Data

Jun. 15, 1990 [JP] Japan ............................. 2-157365
Nov. 21, 1990 [JP] Japan ............................. 2-314393

[51] Int. Cl.⁵ ............................................. G11B 5/09
[52] U.S. Cl. ........................................ 360/46; 360/63; 360/67
[58] Field of Search ......................... 360/46, 63, 66, 67, 360/68

[56] References Cited

U.S. PATENT DOCUMENTS

| 4,523,238 | 6/1985 | Keel et al. ............... | 360/46 |
| 4,651,235 | 3/1987 | Morita et al. ............ | 360/46 |
| 4,803,571 | 2/1989 | Fujioka et al. ........... | 360/63 |

FOREIGN PATENT DOCUMENTS

| 129912 | 10/1980 | Japan . |
| 153514 | 11/1981 | Japan . |
| 161118 | 9/1983 | Japan . |
| 205859 | 10/1985 | Japan . |
| 39910 | 2/1986 | Japan . |
| 111016 | 7/1986 | Japan . |
| 243909 | 10/1986 | Japan . |
| 313302 | 12/1988 | Japan . |

*Primary Examiner*—Paul Gensler
*Attorney, Agent, or Firm*—Wolf, Greenfield & Sacks

[57] ABSTRACT

A magnetic recording and reproducing circuit comprises a recording and reproducing head including a recording coil; an erasing head disposed upstream of the recording and reproducing head and including an erasing coil; a flip-flop which receives pulse-shaped record data and outputs an output signal which reverses the state in accordance with the pulses of the recording data; a delay circuit which receives the output of the flip-flop and delays such output by a predetermined period of time; a record driver which receives the output of the delay circuit for causing a recording current to flow through the recording coil of the recording and reproducing head; and an erasing circuit for causing an erasing current to flow through the erasing coil of the erasing head at the time of recording.

19 Claims, 15 Drawing Sheets

DIGITAL MAGNETIC RECORDING AND REPRODUCING CIRCUIT FOR SUPPRESSING GENERATION OF ASYMMETRY

BACKGROUND OF THE INVENTION

1. Field of the Invention

The present invention relates to a digital magnetic recording and reproducing ciruit, and, more particularly, to a digital magnetic recording and reproducing circuit which is capable of suppressing asymmetry in such a case as when an erasing head is provided upstream of the recording and reproducing head.

2. Background Technology

In the field of digital magnetic recording and reproducing apparatuses, in recent years, the capacities thereof have become increasingly larger and so improvement of the recording density has been accordingly requested. As a consequence of this trend, a medium to be used has in general a higher coercive force while the overwrite characteristics (hereinafter referred to as OWM) of a conventional recording and reproducing head has been degraded resulting in the complicated generation of a peak shift due to overwrapping with the previous record, thus degrading reliability of the apparatus in question. Due to this fact, such a recording and reproducing head having a large saturated flux density or having a larger leakage flux adjacent to the gap is utilized. However, such a material having a large saturated flux density is limited in use from the viewpoints of durability, economical factor or the like. Furthermore, such a head having a large leakage flux adjacent to the gap, for example a head with a large gap length, exhibits the problematic characteristic of a degraded high frequency. As an example of a head having an improved characteristic is described in the proceedings of the technical presentation, 4aA-10 entitled "Recording and Reproducing Characteristics of a Composite Head" (the 11th Assembly of Japan Applied Magnetics Association), where such a head employs the concept of equivalently varying the length of the gap at the time of recording and reproducing. However, this head is also worse than a conventional head in terms of economy. On the other hand, an example of countermeasures against the peak shift due to a degraded OWM with an erasing head being provided upstream of a recording and reproducing head is disclosed in Japanese Patent Public Disclosure No. 39910/86, Patent Public Disclosure No. 243909/86 and Japanese Utility Model Public Disclosure No. 111016/86. According to the examples disclosed in these Laid-open applications, it can be seen that the OWM is improved in such a head which employs a material having a conventional level of saturated magnetic flux density by performing DC erase by use of an erasing head prior to recording data, and that a random peak shift caused by a previous record may be eliminated. In this case, however, a peak shift having an overlapped DC component (referred to in general as asymmetry) is generated. In other words, even when data in a single cycle are recorded, a difference in peak-to-peak interval of reproduced data is generated depending on whether the record magnetization of data is in the same direction as DC erase or not. Normally, when the magnetization generated by an erasing head is in the same direction as the magnetization generated by a recording and reproducing head, the peak-to-peak interval becomes long, while such an interval becomes short when the above-mentioned magnetizations are in opposite direction. As a result, the reliability of a recording and reproducing apparatus may be reduced. This aspect will be explained by referring to FIGS. 1-3.

FIG. 1 illustrates an example of a digital magnetic recording and reproducing circuit. A magnetic head 1 forms a part of a magnetic circuit and comprises a recording and reproducing core 1a having a gap of a predetermined width and a recording and reproducing coil 1b wound around the recording and reproducing core 1a and having a center tap connected to a power supply V. An erasing head 2 provided at a position upstream of the recording and reproducing head 2 forms a part of a magnetic circuit and comprises an erasing core 2a having a gap width wider than that of the recording and reproducing core 1a and an erasing coil 2b wound around the erasing core 2a and having one end connected to the power source V. To a data input terminal 3, record data in the form of pulses, as shown in FIG. 2b, are input. To a signal input terminal 4, a WRITE gate signal shown at FIG. 2(a) is input. The magnetic recording and reproducing circuit is operable for recording when the WRITE gate signal is at a level low ("L"), while the circuit is inhibited from recording and is operable for reproducing when the WRITE gate signal is at a level high ("H"). An inverter 5 is connected to the WRITE gate signal input terminal 4 and is operable so as to reverse the WRITE gate signal to match the logic. A flip-flop 6 is connected to the data input terminal 3 and adapted to receive record data and produce an output signal (refer to FIG. 2(c)) sequentially reversed in response to the record data pulse to a first output terminal Q. A second output terminal $\bar{Q}$ of the flip-flop 6 produces a reversed output signal which is in reverse to the output signal appearing at the first output terminal Q. The reversed WRITE gate signal from the inverter 5 is input to a reset terminal C of the flip-flop 6. When the WRITE gate signal is at a level "L", the output signal and the reversed output signal are output from the first and second output terminals Q and $\bar{Q}$ in accordance with the record data signal. When the WRITE gate signal is at a level "H", the flip-flop 6 is reset so that the outputs from the first and second output terminals Q and $\bar{Q}$ are kept at a level "L" and a level "H", respectively.

A record driver unit 7 for flowing a recording current through the recording coil 1b comprises a first npn transistor 7a having the collector connected to one end of the recording coil 1b and the base connected to the first output terminal Q of the flip-flop 6, a second npn transistor 7b having the collector connected to the other end of the recording coil 1b and the base connected to the second output terminal $\bar{Q}$ of the flip-flop 6, and a constant current means 7c connected to the emitters of the first and second transistor 7a and 7b and activated by the reversed WRITE gate signal from the inverter 5. The constant current circuit 7c may comprise, for example, a resistor connected to the emitters of the first and second transistors 7a and 7b, an npn transistor connected between the resistors and the ground and a resistor connected between the base of the npn transistor and the output terminal of the inverter 5. An erasing unit 8 which is activated by the reversed WRITE gate signal from the inverter 5 for causing a constant erasing current to flow through the erasing coil 2b at the time of recording includes an erasing circuit 8a connected between the other end of the erasing coil 2b and the ground, and may comprise, for example, a resistor connected to the other end of the erasing coil 2b and an npn transistor connected between the transistor and the ground and to the base of which an erasing control signal is applied through the resistor. The reversed WRITE gate signal from the inverter 5 may be used as the erasing control signal.

An operation of the magnetic recording and reproducing circuit constituted such as described above will be explained next. Firstly a condition for inhibiting a recording or for reproducing will be explained. For this condition, the WRITE gate signal at a level "H" is reversed by the inverter 5 to a level "L". The "L" level signal is input to the reset terminal C of the flip-flop 6 and disables the constant current circuit 7c. As a consequence, no recording current flows through the recording coil 1b regardless of input recording data. On the other hand, the erasing circuit 8a is disabled by an erasing control signal whereby no erasing current flows through the erasing coil 2b.

In the recording state, the WRITE gate signal is at a level "L". This signal is reversed by the inverter 5 to a level "H" and input to the reset terminal C of the flip-flop 6 and also to the constant current circuit 7c to activate it. As a consequence, the output signals the states of which are sequentially reversed by the pulses of the input recording data are output from the first and second output terminals Q and $\bar{Q}$ of the flip-flop 6. Namely, the signal from the first output terminal Q changes the state sequentially in response to the reduction of the record data from a level "H" to a level "L", as shown in FIG. 2(c). From the second output terminal $\bar{Q}$, a signal in reverse to the signal from the first output terminal Q is output. The first transistor 7a becomes conductive when the signal from the first output terminal Q is at a level "H" and non-conductive when such a signal is at a level "L", the second transistor 7b becomes conductive when the signal from the second output terminal $\bar{Q}$ is at a level "H" and non-conductive when such a signal is at a level "L". Namely, the second transistor becomes conductive and non-conductive in reverse to the state of the first transistor 7a. As a result, when the first transistor 7a is in the conductive condition, a recording current flows from the power source V via one end of the recording coil 1b, the recording coil 1b, the center tap of the recording coil 1b, the first transistor 7a and the constant current circuit 7c to the ground. When the second transistor 7b is in the conductive condition, a recording current flows from the power source V via the center tap of the recording coil 1b, the recording coil 1b, the other end of the recording coil 1b, the second transistor 7b and the constant current circuit 7c to the ground. Since the recording current flows through the recording coil 1b, a magnetic flux corresponding to the recording current is generated across the gap of the recording coil 1b and makes a record on a recording medium. On the other hand, the erasing circuit 8a is activated by an erasing control signal which flows from the power source V via the erasing coil 2b and the erasing circuit 8a to the ground, whereby a magnetic flux is generated across the gap of the erasing core 2a to erase the previous data recorded on the recording medium, or, magnetize the medium in a constant direction.

A condition of data recorded onto a recording medium at this time will be explained by referring to FIG. 3. The entire width of the previous data recorded on a recording medium 9 (actually, somewhat larger in width than the entire width of data) is erased or magnetized in a constant direction, by the erasing head 2 positioned upstream of the recording and reproducing head 1. Then recording takes place by the recording and reproducing head 1 in accordance with record data, that is, magnetization takes place in the leftward direction indicated by the arrow in FIG. 3(a) when the first transistor 7a is in a conductive state and in the rightward direction as indicated by the arrow in FIG. 3(a) when the second transistor 7b is in a conductive state.

In a magnetic recording and reproducing circuit provided with inexpensive magnetic heads in which an erasing head is located upstream of a recording and reproducing head and constituted such as described above, if record data having equal intervals of pulses are recorded on a record medium, a recording current which flows through the recording coil has a constant cycle as shown in FIG. 2(c), but recorded lengths are different depending on the magnetizing direction as shown in FIG. 3(a) due to a leakage of a magnetic flux from the erasing head 2. As a result, waveforms and pulses reproduced from the recording medium which have been recorded in a manner mentioned above have patterns as shown in FIGS. 3(c) and 3(d). The reproduced pulses assume an equal pulse interval for every other pulse, but adjacent pulse intervals $T_1$ and $T_2$ are different, resulting in a larger asymmetry $T_3$. Besides, a conventional magnetic recording and reproducing apparatus of a large capacity has to employ expensive magnetic heads, resulting in a higher price of the entire apparatus. To the contrary, if inexpensive magnetic heads are used for the apparatus, the reliability of such an apparatus may be reduced.

SUMMARY OF THE INVENTION

The present invention has been proposed in light of the problems described above and has as an object to provide a magnetic recording and reproducing circuit which is capable of suppressing generation of asymmetry even when an erasing head is disposed upstream of a recording and reproducing head.

According to an aspect of the present invention, a magnetic recording and reproducing circuit comprises a flip-flop means which receives pulse-shaped record data to provide an output signal which sequentially reverses the state in accordance with the pulses of the record data; a delay means operable to receive such output of said flip-flop means for delaying the output of said flip-flop means by a predetermined period of time; a record driver means which receives the output of said delay means for causing a recording current to flow through a recording coil of a recording and reproducing head; and an erasing means disposed upstream of the recording and reproducing head for causing an erasing current to flow through an erasing coil of an erasing head at the time of recording.

The delay means operates to delay the rise or fall of the output of the flip-flop means whereby the record driver means makes the width of a recording current flowing through the recording coil in the positive direction different from that of a recording current flowing through the recording coil in the negative direction. As a result, a difference in recorded length due to the direction of magnetization recorded on a record medium may be reduced.

According to another aspect of the present invention, a digital magnetic recording and reproducing circuit comprises a flip-flop means which receives record data; a delay means for delaying one of the outputs of said flip-flop means; and an exclusive OR means for producing an exclusive OR output of the output of said delay means and the other of the outputs of said flip-flop means to supply the exclusive OR output to a record driver means which drives a recording and reproducing head.

According to a further aspect of the present invention, a digital magnetic recording and reproducing circuit comprises a flip-flop means which receives record data; a first delay means for delaying one of the outputs of said flip-flop means; a second delay means for a delaying the other of the outputs of said flip-flop means by a delay time different from that of said first delay means; and an exclusive OR means for producing an exclusive OR output of the outputs of said first and second delay means to supply the exclusive OR output to a record driver means which drives a recording and reproducing head.

The flip-flop means operates to output, from the respective output terminals, signals which reverse the state for each pulse of the record data. The delay means operates to delay the signals output from the flip-flop means so that such signals may be output at different times. The exclusive OR means operates to supply an output signal to a record driving means which applies record data pulses having different widths to the recording and reproducing head.

DESCRIPTION OF PREFERRED EMBODIMENTS

Figure 1:
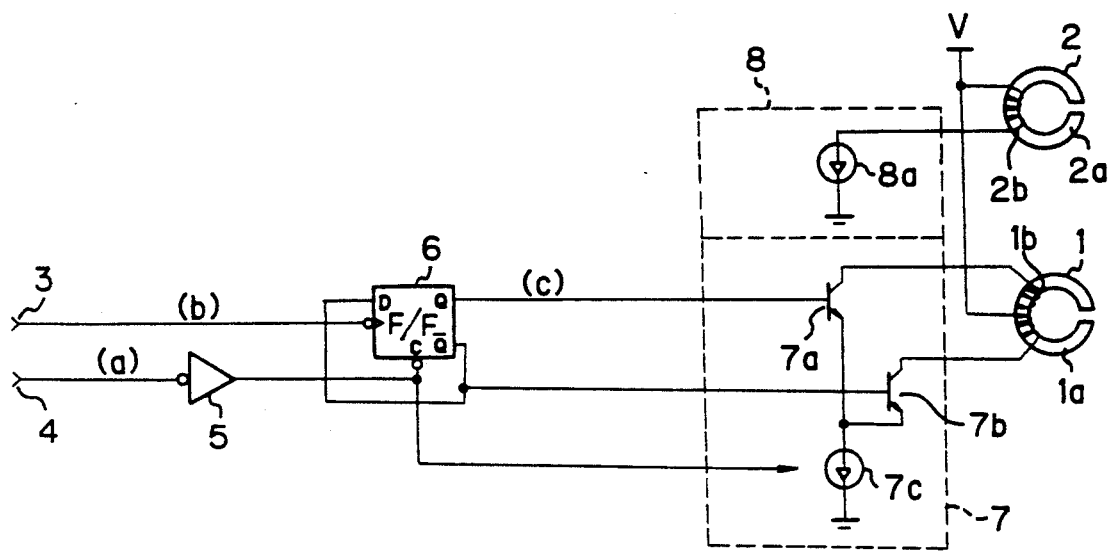
FIG. 1 is a circuit diagram illustrating a magnetic recording and reproducing circuit according to the prior art.
Figure 2:
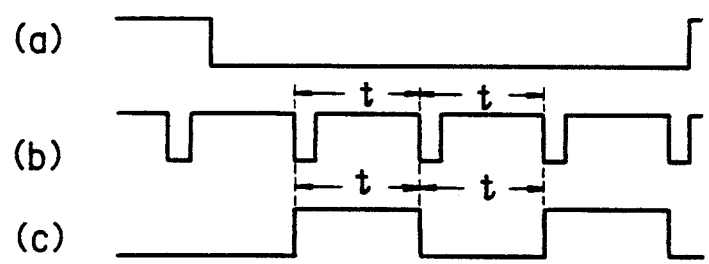
FIG. 2 illustrates waveforms at portions of the circuit shown in FIG. 1.
Figure 3:
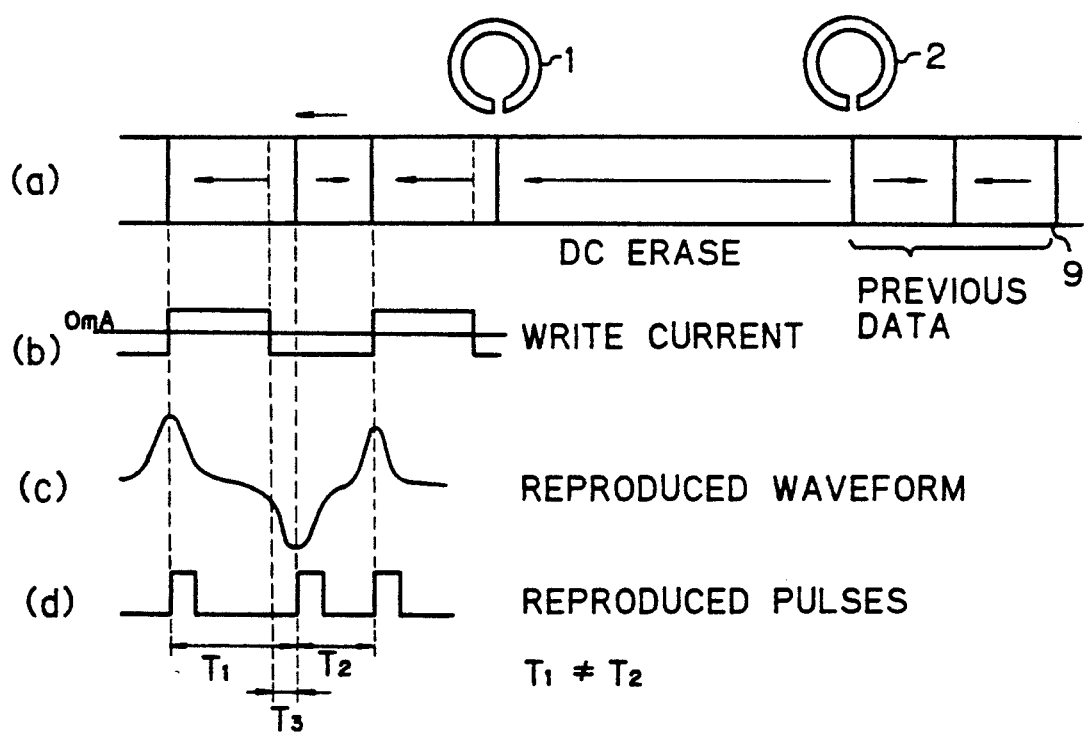
FIG. 3 illustrates a magnetized condition on a recording medium at the time of recording by using the circuit shown in FIG. 1, a waveform of a recording current, a reproduced waveform and a waveform of reproduced pulses.

Some embodiments of a magnetic recording and reproducing apparatus according to the present invention will now be explained by referring to the accompanying drawings wherein the same numerals and symbols as used in FIG. 1 designate like or corresponding components.

Figure 4:
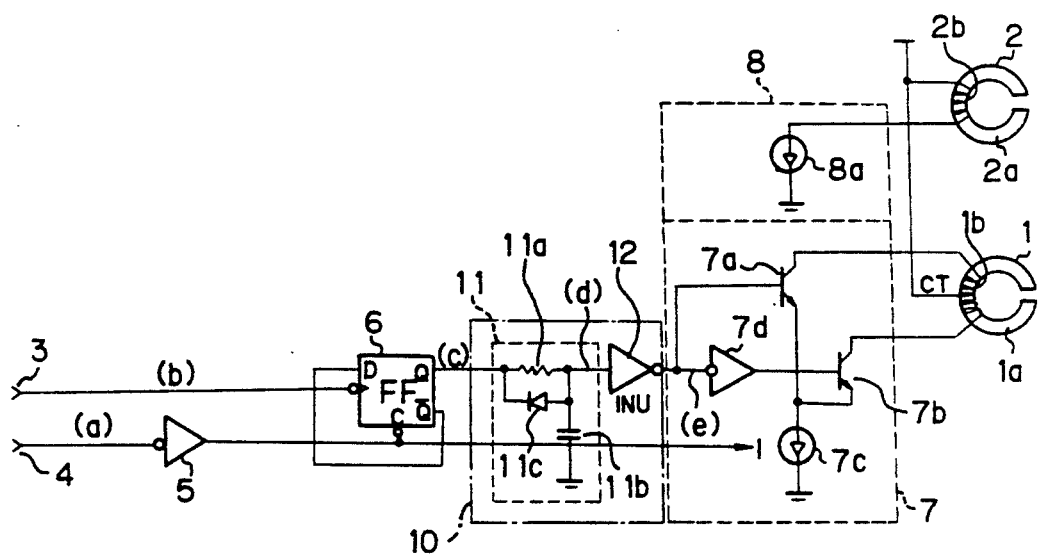
FIG. 4 is a circuit diagram illustrating the first embodiment of the present invention.
Figure 5:
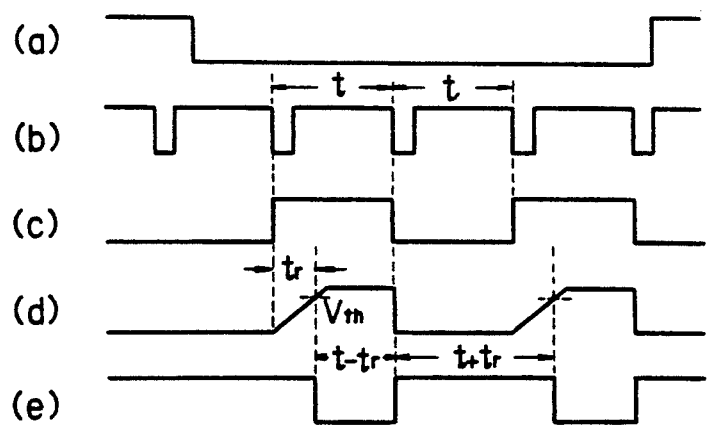
FIG. 5 illustrates waveforms at portions of the circuit shown in FIG. 4.

FIG. 4 is a block diagram illustrating the constitution of the first embodiment of a recording and reproducing apparatus according to the present invention. The apparatus according to the first embodiment includes a delay means 10 which receives a signal output from the first output terminal Q of a flip-flop 6 and delays each rising edge of the output signal by a predetermined time interval, say $t_r$ corresponding to the magnitude of asymmetry occurred when the pulse width of record data is equi-distant. The delay unit 10 comprises a delay circuit 11 including a resistor 11a having one end connected to the first output terminal Q of the flip-flop 6, a capacitor 11b connected between the other end of the resistor 11a and the ground and a diode 11c connected across the resistor 11a. The delay circuit 11 provides a signal which rises in accordance with a specified time constant at the time of the rise of the output signal fed from the first output terminal Q of the flip-flop 6 and falls at the same time as the fall of the output signal fed from the terminal Q of the flip-flop 6, as shown in FIG. 5(d). The delay unit 10 further comprises an inverter 12 which receives a signal output from the delay circuit 11 and outputs a signal, as shown in FIG. 5(e), when the signal output from the flip-flop 6 exceeds a predetermined threshold value Vth. A record driver unit 7 for causing a recording current to flow through a recording coil 1b comprises a first npn transistor 7a having the collector connected to one end of the recording coil 1b and the base connected to the output of the delay unit 10, an inverter 7d connected to the output terminal of the delay unit 10 for reversing the signal output from the inverter 12, a second npn transistor 7b having the collector connected to the other end of the recording coil 1b and the base connected to the output terminal of the inverter 7d and a constant current circuit 7c connected to the emitters of these first and second transistors 7a and 7b and activated by a WRITE gate signal, i.e., a signal from the inverter 5.

An operation of the magnetic recording and reproducing apparatus thus constituted will next be explained. A record inhibited condition or a reproducing condition will first be explained. At this condition, a WRITE gate signal shown in FIG. 5(a) is at a level "H". This signal is reversed by the inverter 5 to a level "L" and input to the reset terminal C of the flip-flop 6 and deactivates the constant current circuit 7c. As a consequence, the record driver unit 7 becomes inoperable, and no recording current flows through the recording coil 1b regardless of input record data. In the meantime, the erasing circuit 8a is deactivated by an erasing control signal and no erasing current flows through the erasing coil 2b.

In the recording condition, the WRITE gate signal is at a level "L" and reversed by the inverter to a level "H" which is input to the reset terminal C of the flip-flop 6 and to the constant current circuit 7c to activate it. As a consequence, an output signal which sequentially reverses the state in accordance with the input record data shown in FIG. 5(b) is output from the first output terminal Q of the flip-flop 6. More specifically, a signal output from the first output terminal Q changes the state between level "H" and "L" in accordance with the fall of the record data, and assumes the waveform shown in FIG. 5(c). The delay circuit 11 of the delay unit 10 which receives the signal output from the first output terminal Q of the flip-flop 6 provides an output signal which rises with a specified time constant at the time of rise of the output signal fed from the first output terminal Q of the flip-flop 6 and falls at the same time as the fall of the Q output signal. The inverter 12 in the delay unit 10, in response to the rise of the signal output from the delay circuit 11 outputs such a signal shown in FIG. 5(e) as changes from a level "H" to a level "L" when the signal from the inverter 12 exceeds a predetermined potential or a threshold voltage value and changes from a level "L" to a level "H" in response to the fall of the output of the inverter 5. As shown in FIG. 5(e), the output of the inverter 12 stays at a level "L" for $(t-t_r)$ and at a level "H" for $(t+t_r)$. When the output of the inverter 12 in the delay unit 10 rises to a level "H", the first transistor 7a becomes conductive, and when the output of the inverter 12 falls to a level "L", the first transistor becomes non-conductive. When the output of the inverter 12 in the delay unit falls to a level "L" and the signal from the inverter 7d is at a level "H", the second transistor 7b becomes conductive. When the output of the inverter 12 is at a level "H" and the signal output from the inverter 7d is at a level "L", the transistor 7b becomes non-conductive. Thus the first transistor 7a operates opposite to the second transistor 7b. As a result, when the first transistor 7a is conductive, the recording current flows for a period of $(t+t_r)$ from the power supply source V via one end of the recording coil 1b, the recording coil 1b, the center tap of the recording coil 1b, the first transistor 7a and the constant current means 7c to the ground. When the second transistor 7b is conductive, the recording current flows for a period of $(t-t_r)$ from the power source V via the center tap of the recording coil 1b, the recording coil 1b, the other end of the recording coil 1b, the second transistor 7b and the constant current circuit 7c to the ground. Due to the recording current flowing through the recording coil 1b, a magnetic flux corresponding to the recording current is generated across the gap of the recording core 1a and recording is made on the recording medium. On the other hand, the erasing circuit 8a is activated by the erasing control signal and the erasing current flows from the power source V via the erasing coil 2b and the erasing circuit 8a to the ground whereby a magnetic flux is generated across the gap of the erasing core 2a to erase the previous data which were recorded on the recording medium, or magnetize the recording medium in a constant direction.

Figure 6:
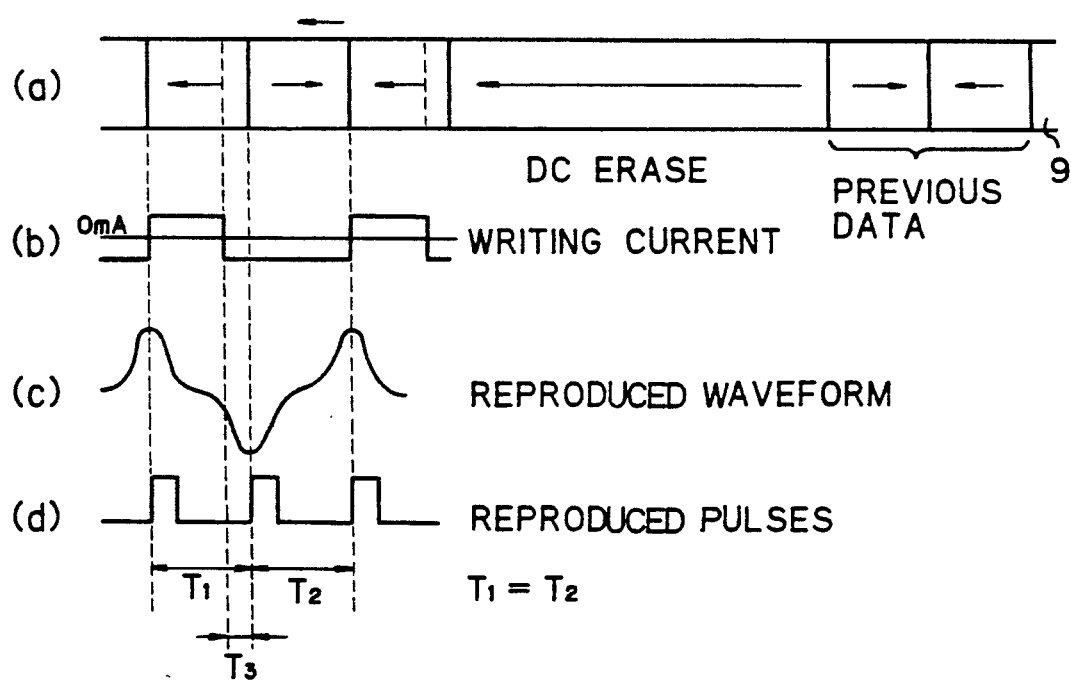
FIG. 6 illustrates a magnetized condition on a recording medium at the time of recording by using the circuit shown in FIG. 4, a waveform of a recording current, a reproduced waveform and a waveform of reproduced pulses.

The condition of the recording medium at this time will be explained by referring to FIG. 6. The entire width of the previous data which were recorded on the recording medium 9 (actually a width somewhat larger than the entire width) is erased or magnetized in a constant direction by the erasing head 2 disposed upstream of the recording and reproducing head 1. And then, recording takes place on the recording medium by the recording and reproducing head 1 in accordance with the record data, that is, when the second transistor 7b is conductive for a period of time $(t-t_r)$, the recording medium is magnetized in the leftward direction indicated by the arrow in FIG. 6(a), and, when the first transistor 7a is conductive for a period of time $(t+t_r)$, the recording medium is magnetized in the rightward direction indicated by the arrow. The intervals between adjacent pulses of the record data are equal. However, since the widths of the recording current are made different in the positive direction and in the negative direction by the delay unit 10, as shown in FIG. 6(b), wraparound of the magnetic flux from the erasing head 2 can be cancelled whereby the recorded length may be made equal regardless of the magnetizing direction as shown in FIG. 6(a). As a consequence, a wave shown in FIG. 6(c) is reproduced from the recording medium having thus been recorded, and pulses are equidistantly generated, as shown in FIG. 6(d), thus eliminating the asymmetry.

Figure 7:
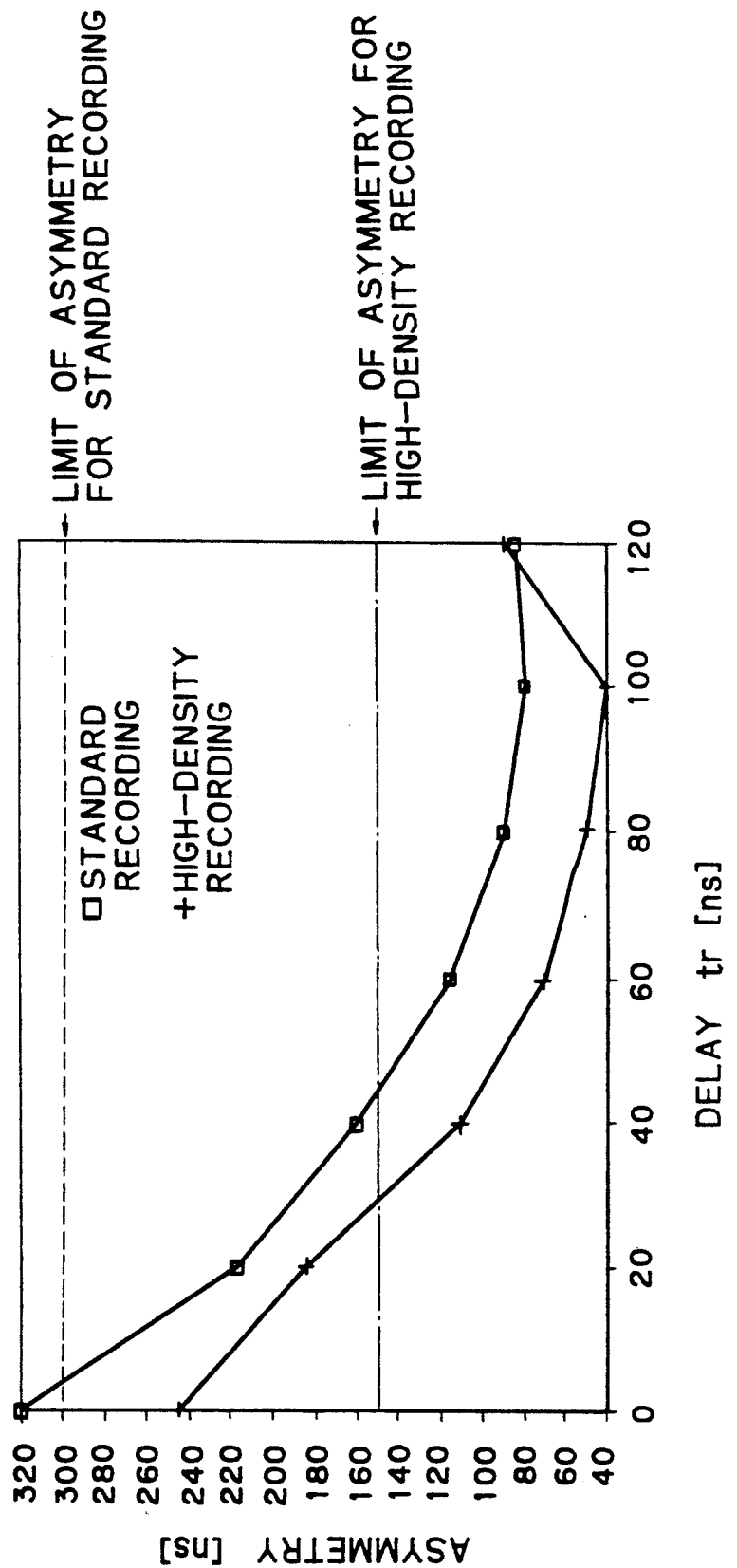
FIG. 7 illustrates a relationship between a delay time $t_r$ provided by a delay means shown in FIG. 4 and the asymmetry.

FIG. 7 shows changes in standard recording and high density recording performed by using the circuit shown in FIG. 4 and varying the delay time $t_r$ of the delay unit 10. As it is clear from FIG. 7, in the case of standard recording, the asymmetry is practical when the delay time $t_r$ is between 20 and 120[ns], and becomes optimum when the delay time $t_r$ is between 80 and 120[ns], the most optimum value of $t_r$ being 100[ns]. In the case of high density recording, the asymmetry is favourable when $t_r$ is between 40 and 120[ns], and optimum when $t_r$ is between 80 and 120[ns], the most optimum value of $t_r$ being 100[ns].

Figure 8:
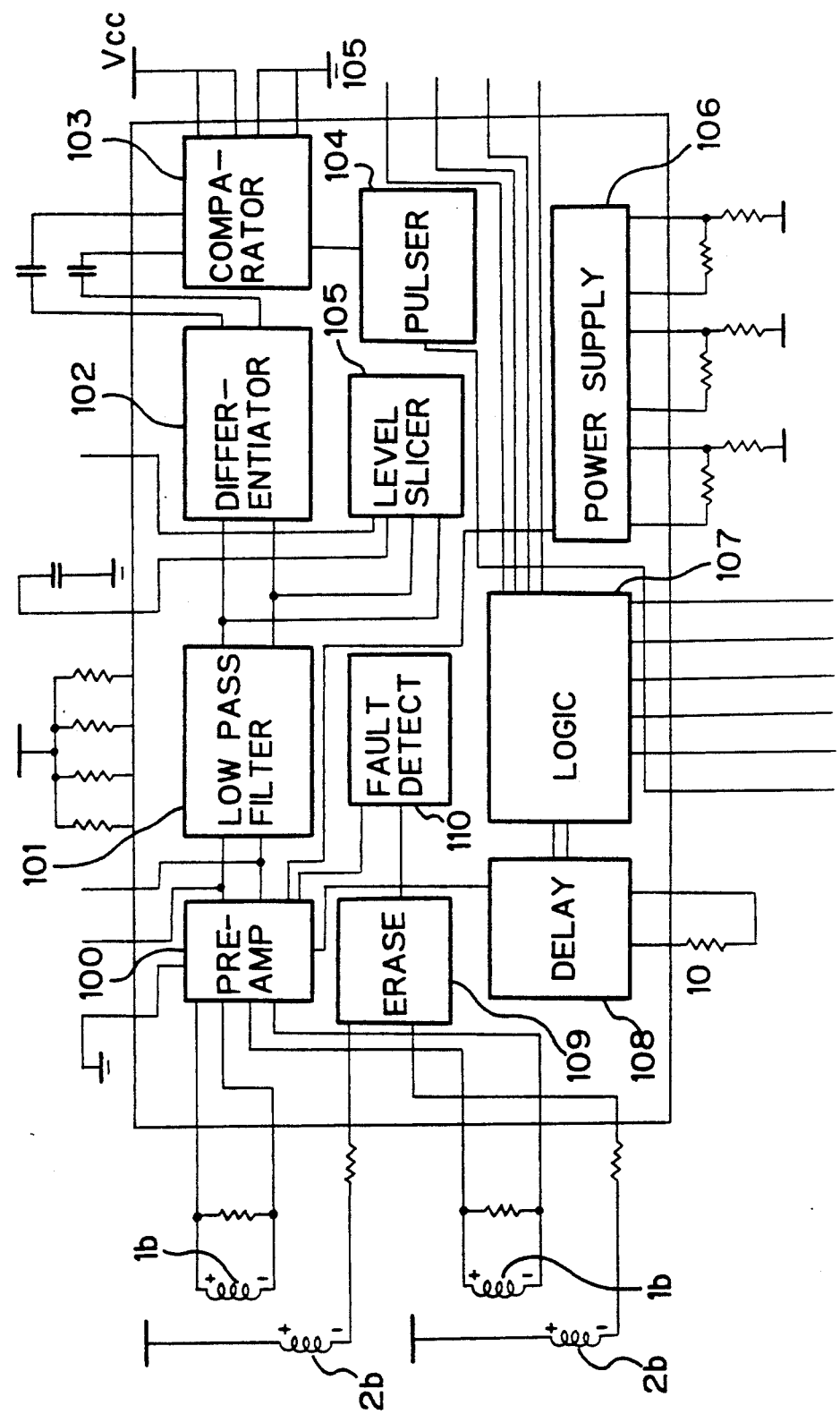
FIG. 8 is a block diagram illustrating an integrated circuit for driving a floppy disc incorporating the circuit shown in FIG. 4.

FIG. 8 is a block diagram of an integrated circuit for driving a floppy disc incorporating the magnetic recording and reproducing apparatus shown in FIG. 4. In FIG. 8, a block 100 includes a preamplifier for amplifying a signal reproduced by the recording head 1 and a recording driver for causing a recording current to flow through the recording and reproducing head 1, and corresponds to the record driver circuit shown in FIG. 4. A block 101 includes a low pass filter for removing a noise component included in the signal output from the preamplifier 100; a block 102 a differentiator for differentiating the signals output from the low pass filter 101; a block 103 a comparator circuit for comparing the signals output from the differentiator 102; a block 104 a pulse forming circuit for converting the output of the comparator circuit 103 into pulses; a block 105 a level slicing circuit for removing a zero-crossing noise included in the signal from the comparator circuit 103; a block 106 a recording current source circuit for setting a recording current flowing through the recording and reproducing head 1; a block 107 a logic circuit for causing control signals to perform predetermined operations; a block 108 a circuit for setting a delay time to compensate asymmetry, the block 108 including the inverter 5, the flip-flop 6 and the delay unit 10 shown in FIG. 4; a block 109 an erasing driver circuit for providing and erasing current which includes the erasing unit 8 shown in FIG. 4; and a block 110 an error voltage detecting circuit for inhibiting recording when the source voltage is in error.

Figure 9:
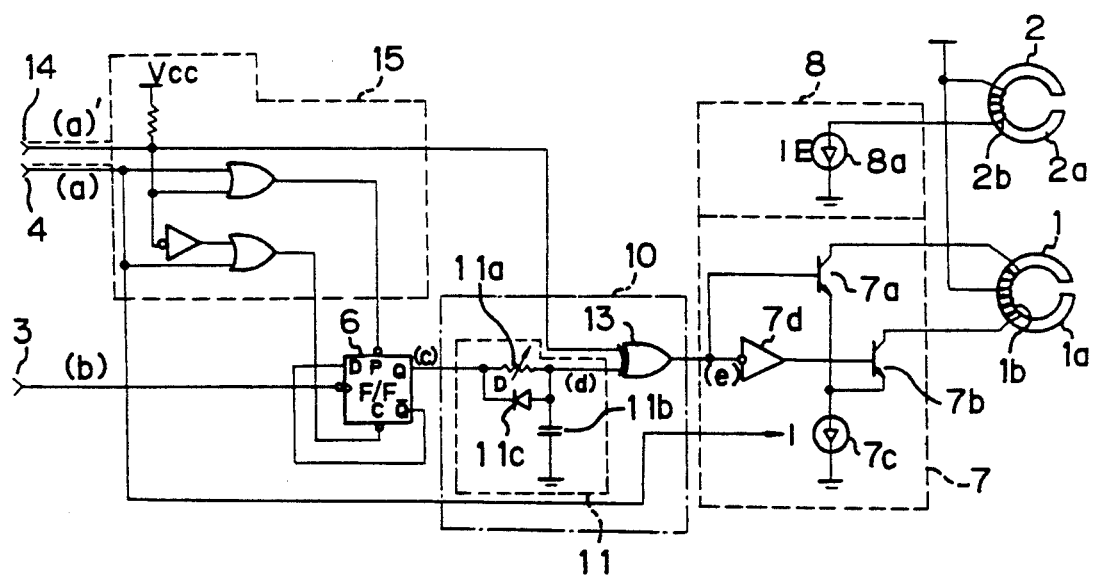
FIG. 9 is a circuit diagram illustrating the second embodiment of the present invention.

FIG. 9 is a block diagram illustrating the second embodiment of a magnetic recording and reproducing apparatus according to the present invention. It is to be noted that, although the asymmetry is compensated for only in one direction in the apparatus shown in FIG. 4, the second embodiment can change the direction in order to compensate for the asymmetry. The differences between the circuits shown in FIG. 9 and FIG. 4 are that (1) the inverter 12 of the delay unit 10 in the circuit shown in FIG. 4 has been replaced with an exclusive OR circuit 13 in FIG. 9; (2) an input terminal 14 for receiving a compensation reversal signal is provided, and also a compensation reversal circuit 15 which receives a compensation reversal signal and a WRITE gate signal so as to control a flip-flop 6 and the exclusive OR circuit 13 is provided; and (3) the resistor 11a of the delay circuit 11 is replaced by a variable resistor capable of assuming three different resistance values so that optimum compensation can be made in accordance with the standard recording, the high density recording and the super-high density recording.

Figure 10:
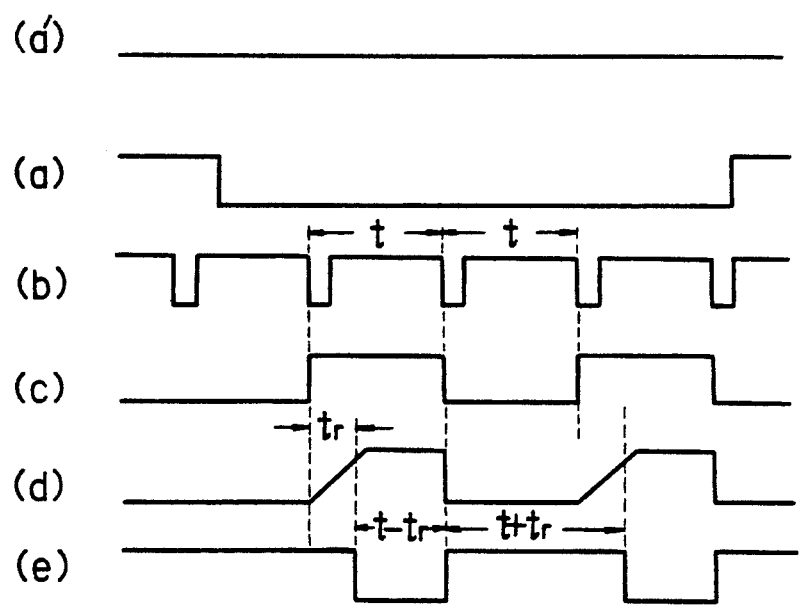
FIGS. 10 and 11 illustrate waveforms at respective portions of the circuit shown in FIGS. 9.

The compensation reversal circuit 15 provides a level "H" signal to the preset terminal P of the flip-flop 6 to prevent the flip-flop 6 from being preset when the compensation reversal signal is at a level "H", and provides a level "L" signal to the reset terminal C of the flip-flop 6 to reset the flip-flop 6 when the WRITE gate signal is at a level "L", whereby the exclusive OR circuit 13 may output a signal reversed to the output of the delay circuit 11. Waveforms of the signals at the portions in FIG. 9 are shown in FIG. 10. As seen from FIG. 10, the output of the delay circuit 11 stays at a level "H" for $(t+t_r)$ and at a level "L" for $(t-t_r)$, and the first transistor 7a remains conductive longer than the second transistor 7b.

Figure 11:
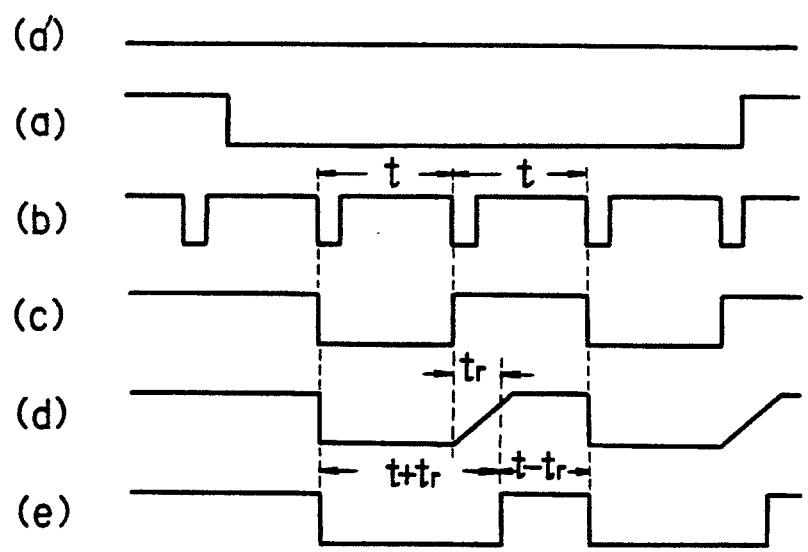

On the other hand, the compensation reversal circuit 15 when the compensation reversal signal is at a level "L" provides a level "H" signal to the reset terminal C of the flip-flop 6 to inhibit the flip-flop 6 from being preset, and provides a level "L" signal to the preset terminal P of the flip-flop 6 to preset the flip-flop 6 when the WRITE gate signal is at a level "L", whereby the exclusive OR circuit 13 may output a signal having the same phase as that of the output of the delay circuit 11. Waveforms of the signals at the respective portions in FIG. 10 are shown in FIG. 11. Contrary to the circuit shown in FIG. 4, the output of the delay circuit 10 stays at a level "H" for $(t-t_r)$ and at a level "L" for $(t+t_r)$, and the second transistor 7b remains conductive longer than the first transistor 7a.

In the second embodiment constituted such as described above, since the relationship of the conduction time between the first and second transistors 7a and 7b can be altered in accordance with the compensation reversal signal, it may be easy to extend the period of time for the recording current to flow through the recording and reproducing head in order to magnetize the recording medium in the direction different from that of magnetizing the recording medium by the erasing head 2.

Figure 12:
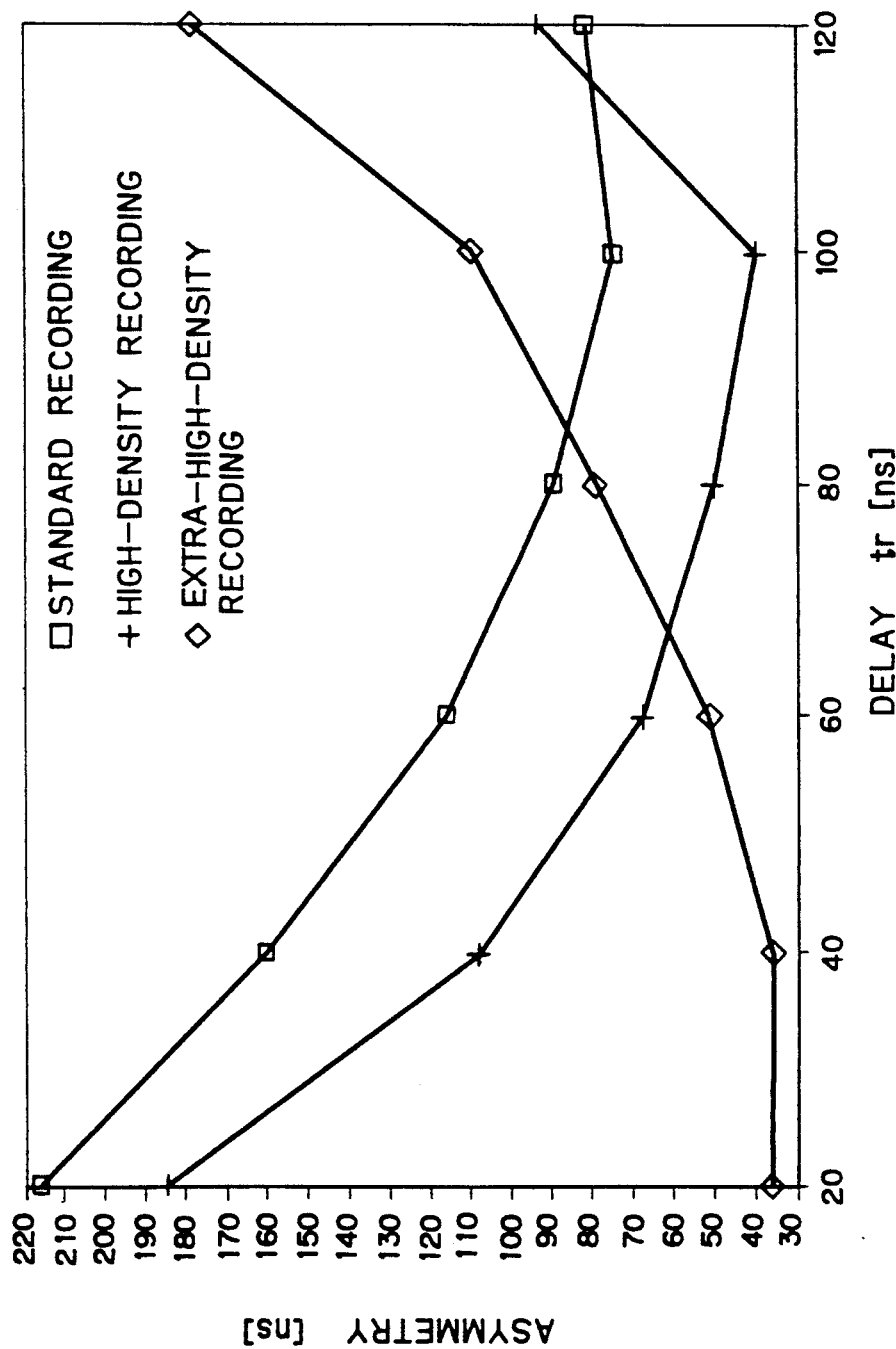
FIG. 12 illustrates a relationship between a delay time $t_r$ provided by a delay means in the circuit shown in FIG. 9 and the asymmetry.

FIG. 12 shows relationships between the delay time $t_r$ by the delay unit 10 and the asymmetry in the case of super-high density recording as well as in the case of normal and high density recordings. As is apparent from FIG. 12, an optimum value of the delay time relative to the asymmetry in the case of super-high density recording is considerably different from optimum values in the case of standard recording and high density recording. Accordingly, in the second embodiment shown in FIG. 9, the resistance value of the resistor 11a in the delay circuit 11 is changeable depending on the respective modes of recording.

Figure 13:
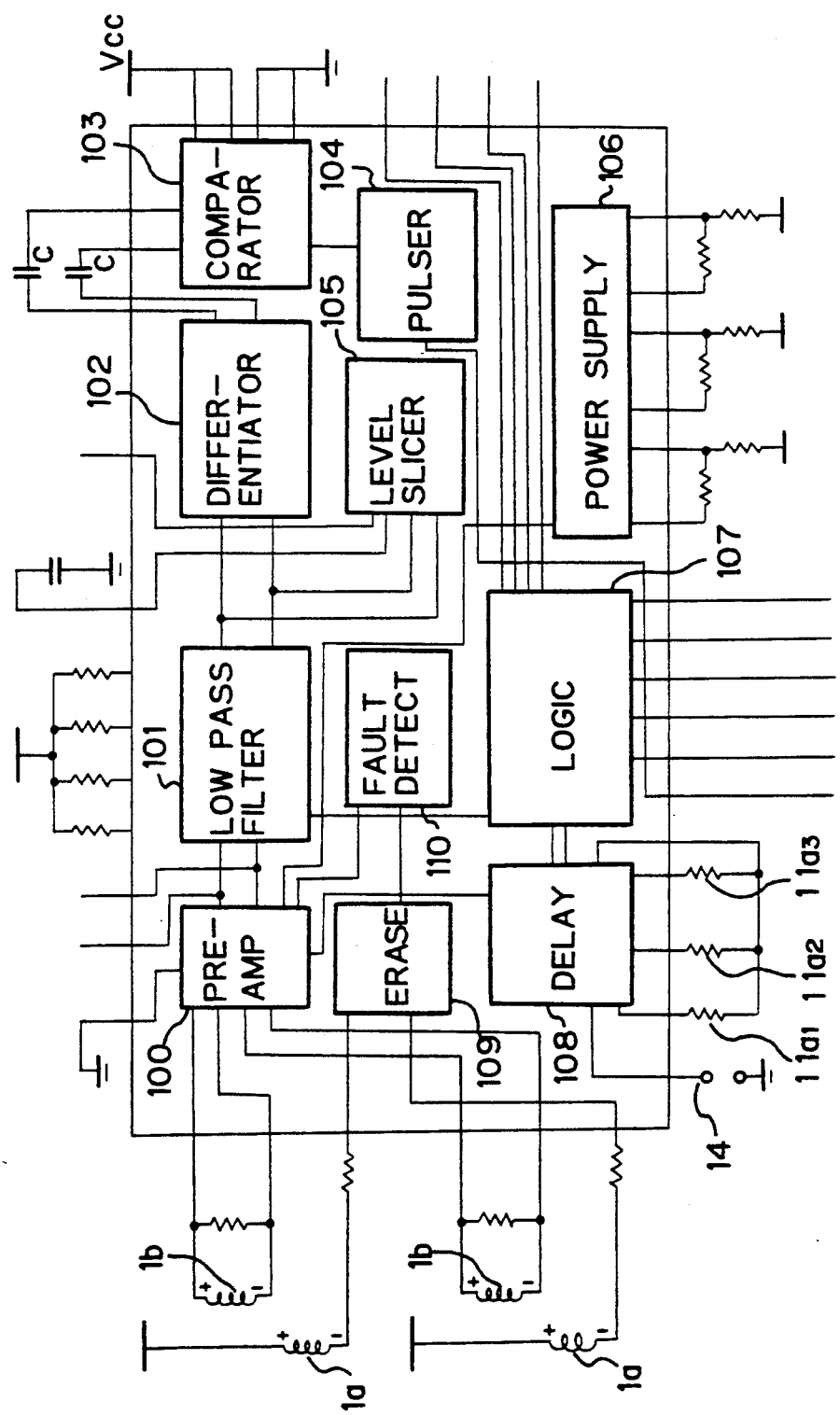
FIG. 13 is a block diagram illustrating an integrated circuit for driving a floppy disc incorporating the circuit shown in FIG. 9.

FIG. 13 is a block diagram of an integrated circuit for driving a floppy disc incorporating the magnetic recording and reproducing circuit shown in FIG. 9 and including circuits similar to those of FIG. 8. The circuit 108 includes the flip-flop 6, the delay unit 10 and the compensation reversal circuit 15. The resistor means of the delay circuit 11 comprises three external resistors 11a1, 11a2 and 11a3 having different resistance values. The circuit 108 includes a circuit to select one of these three resistors 11a1, 11a2 and 11a3 depending on the recording modes.

As explained above, the magnetic recording and reproducing apparatus according to the first or second embodiment comprises a flip-flop which receives pulse-shaped record data and outputs a signal the state of which is sequentially reversed in accordance with the record data; a delay means which receives the output signal from the flip-flop and delays the rise or fall of the output signal by a predetermined period of time; a record driver means which receives the output of the delay means for causing a recording current to flow through a recording coil of a recording and reproducing head; and an erasing means disposed upstream of the recording and reproducing head for causing an erasing current to flow through an erasing coil of an erasing head at the time of recording. Consequently, the asymmetry may be suppressed, and the reliability may be enhanced even if an inexpensive magnetic head of a type having an erasing head positioned upstream of a recording and reproducing head is employed.

Figure 14:
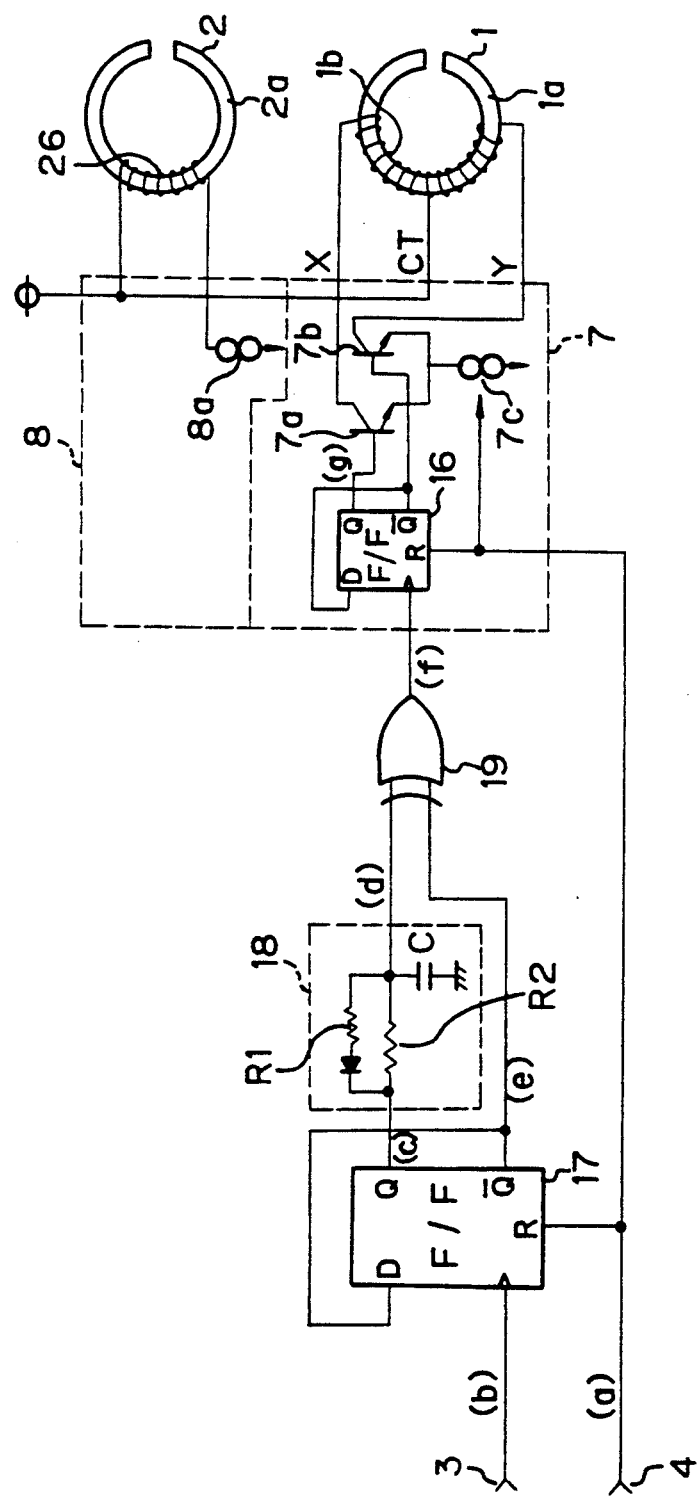
FIG. 14 illustrates the constitution of the third embodiment of the present invention.

FIG. 14 is a block diagram illustrating the constitution of the third embodiment of a magnetic recording and reproducing apparatus according to the present invention. A record driver circuit 7 includes an internal flip-flop 16 and npn transistors 7a and 7b. An external flip-flop 17 receives record data pulses from a record data pulse input terminal 3. A delay circuit 18 is connected to the positive output terminal Q of the external flip-flop 17 and comprises a series circuit of a resistor $R_1$ and a diode, a resistor $R_2$ connected in parallel to the series circuit and a capacitor C connected between a junction of the capacitor C and the resistor $R_1$ and the ground. An exclusive OR circuit 19 receives the outputs of the delay circuit 18 and the terminal $\overline{Q}$ of the external flip-flop 17 and sends an output signal to the internal flip-flop 16. A WRITE gate signal from an input terminal 4 is input to the reset terminals R of the flip-flops 16 and 17 and a current source 7c for the transistors 7a and 7b.

Figure 15:
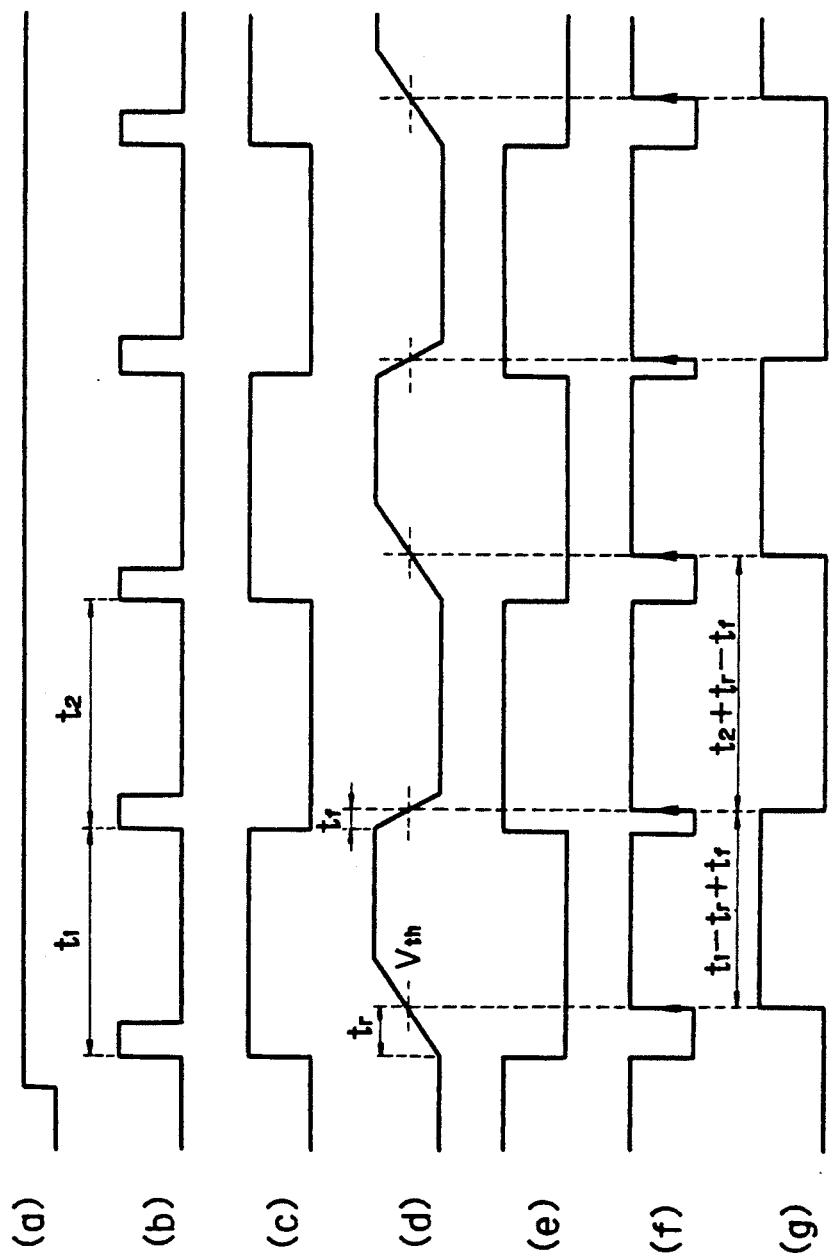
FIG. 15 is used to explain an operation of the embodiment shown in FIG. 14.

The operation of the apparatus thus constituted will now be explained by referring to FIG. 15. Assume that, when a current flows to one end X of a recording and reproducing head 1, a magnetic field is generated in the recording and reproducing head 1 in the same direction as that of a magnetic field generated in the erasing head 2, and that the Q output of the internal flip-flop 16 contained in the record driver circuit 7 is at a level "H".

When a signal at the WRITE gate signal input terminal 4 is at a level "L" and the apparatus is not in the writing condition, the internal flip-flop 16 contained in the record driver 7 and the external flip-flop 17 are both reset to a level "L".

When a WRITE gate signal at the input terminal 4 is at a level "H", that is, the apparatus is in the writing condition (FIG. 15(a)), and a record data pulse (FIG. 15(b)) is input from the input terminal 3 to the external flip-flop 17, the external flip-flop 17 reverses the state for every record data pulse (FIG. 15(c)). The delay circuit 18 delays the rise of the Q output of the external flip-flop 17 by a time constant determined by the resistor $R_2$ and the capacitor C. After the input signal rises, when a time $t_r$ has passed, the output of the delay circuit 18 exceeds a threshold value Vth (FIG. 15(d)). On the other hand, since the $\overline{Q}$ output (FIG. 15(e)) of the flip-flop 17 is input directly to the exclusive OR circuit 19, the output of the exclusive OR circuit 19 becomes a level "L" simultaneously with the fall of the $\overline{Q}$ output of the external flip-flop 17, or, the rise of the Q output, and becomes a level "H" when the output of the delay circuit 18 exceeds the threshold value Vth (FIG. 15(f)).

When a record data pulse (FIG. 15(b)) is input again from the record data input terminal 3 to the external flip-flop 17, the Q output of the external flip-flop 17 becomes a level "L" (FIG. 15(c)). At this time, the diode D of the delay circuit 18 turns ON and the output of the delay circuit 18 becomes smaller than the threshold value Vth (FIG. 15(d)) after the time $t_r$ which is decided by the capacitance of the capacitor C and a composite resistance value $(R_1 \times R_2)/(R_1+R_2)$ of the parallel, connected resistors $R_1$ and $R_2$. The output of the exclusive OR circuit 19 becomes a level "L" simultaneously with the rise of the $\overline{Q}$ output or the fall of the Q output of the flip-flop 17 and becomes a level "H" when the output of the delay circuit 18 becomes smaller than the threshold value Vth (FIG. 15(f)).

As seen from the above description, since the delay circuit 18 has different delay times depending on the rise and fall of the input signal, the width of adjacent pulses output from the exclusive OR circuit 19 is different (FIG. 15(f)). Since the internal flip-flop 16 reverses the state in response to the rise of the output of the exclusive OR circuit 19, a time difference $2 \times (t_r - t_f)$ is produced between levels "H" and "L" (FIG. 15(g)) whereby alternate magnetization of the recording medium 9 in opposite direction may be compensated for by this time difference, and thus the asymmetry at the time of reproduction may be reduced.

Figure 16:
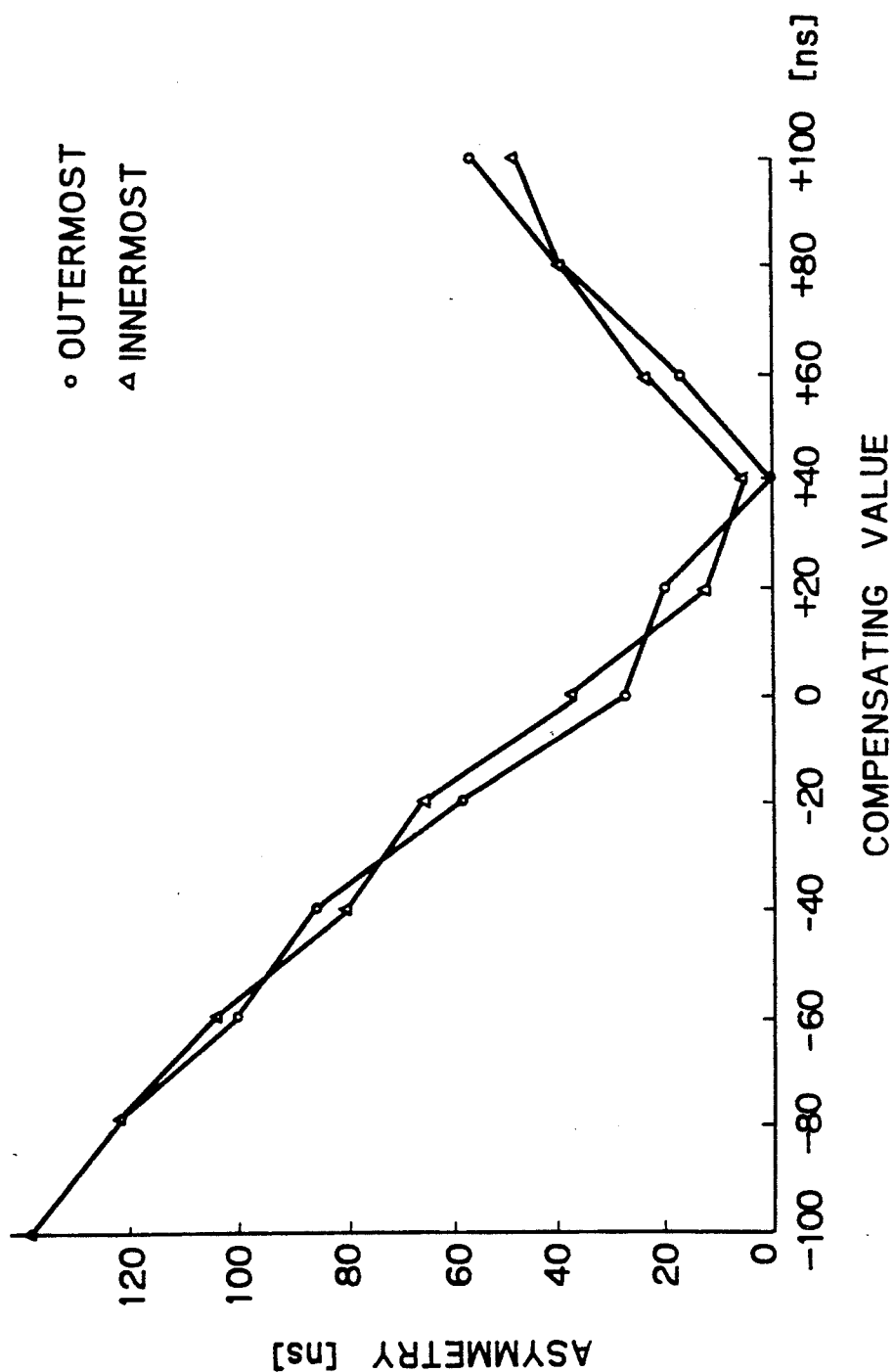
FIG. 16 illustrates advantages provided by the embodiment shown in FIG. 14.

FIG. 16 illustrates an example of the effects provided by the third embodiment of the present invention. The abscissa designates $(t_r - t_f)$ and the ordinate designates an amount of asymmetry generated. It can be understood from FIG. 16 that the asymmetry may be effectively reduced by adjusting the time difference $(t_r - t_f)$ regardless of the position of the recording and reproducing head 1.

Figure 17:
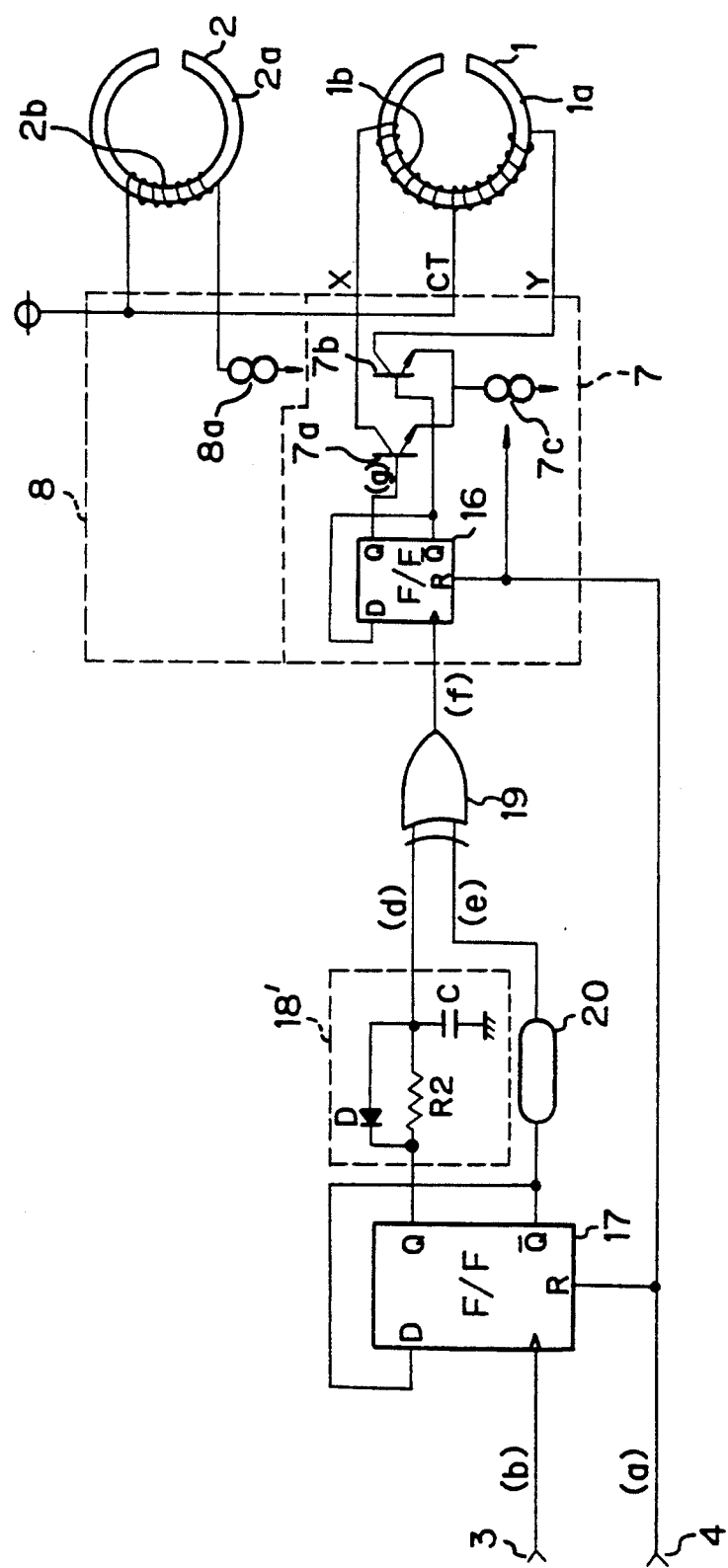
FIG. 17 illustrates the constitution of the fourth embodiment of the present invention.

FIG. 17 is a block diagram illustrating the fourth embodiment of a magnetic recording and reproducing apparatus according to the present invention. In this figure, a second delay circuit 20 having a delay time of $t_d$ is connected to the output terminal $\overline{Q}$ of the external flip-flop 17, and the output of the second delay circuit 20 is the other input to an exclusive OR circuit 19. Compared to the delay circuit 18 in the third embodiment shown in FIG. 14, the resistor $R_1$ is removed from a first delay circuit 18', thereby delaying the rise of an input signal by $t_r$. The delay time $t_d$ provided by the second delay circuit 20 is longer than the delay time $t_r$ provided by the first delay circuit 18. It is to be noted that the fourth embodiment applied to such a case as the internal flip-flop 16 in a record driver circuit 7 reverses the state at the time of the fall of the output of the exclusive OR circuit 19.

Figure 18:
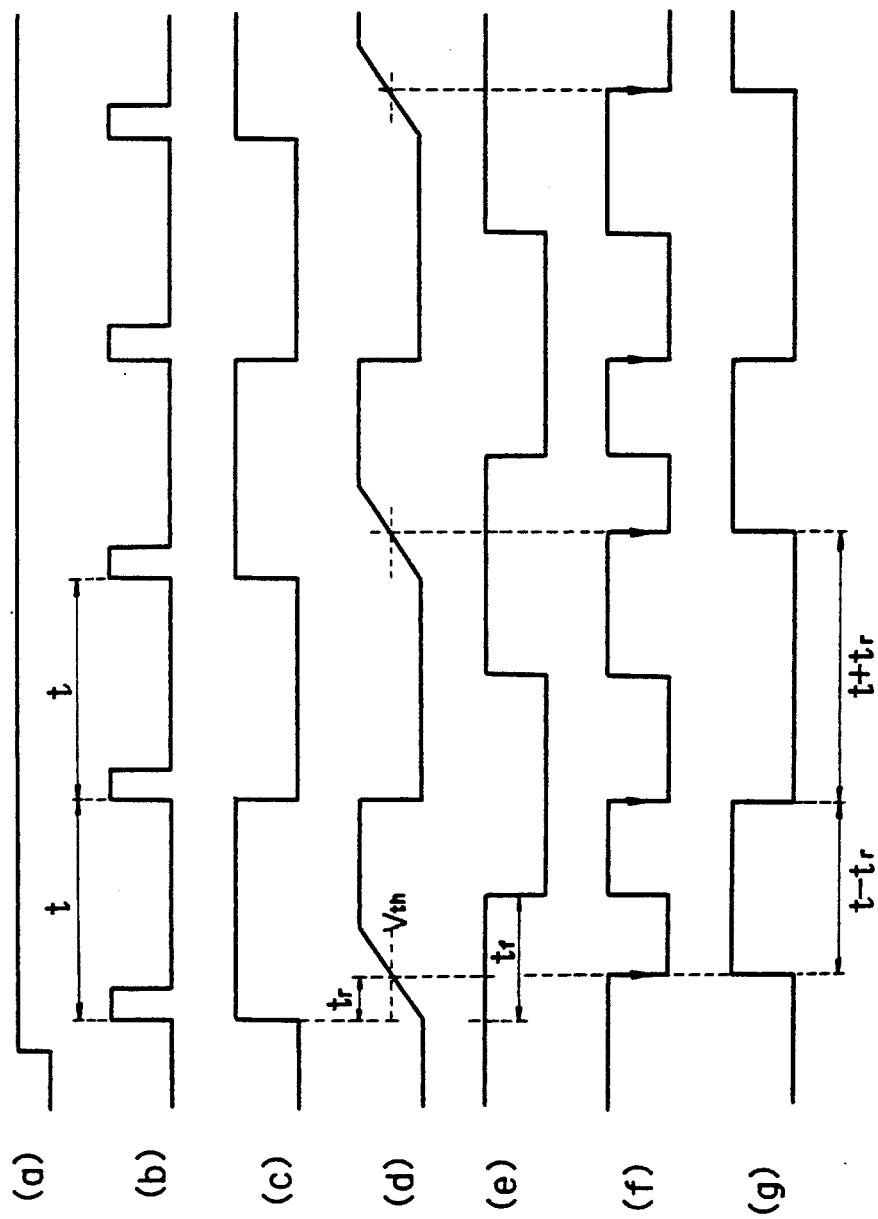
FIG. 18 is used to explain an operation of the embodiment shown in FIG. 17.

FIG. 18 is used to explain an operation of the fourth embodiment shown in FIG. 17. When a WRITE gate signal is at a level "L" and the apparatus is not in the writing condition, an internal flip-flop 16 in the record driver circuit 7 and the external flip-flop 17 are both reset to a level "L".

When the WRITE gate signal rises to a level "H", that is, the apparatus is in the writing condition (FIG. 18(a)), and recording data (FIG. 18(b)) are input to the external flip-flop 17, the output of the external flip-flop 17 reverses the state for every pulse of the record data (FIG. 18(c)). In response to the rise of the Q output of the flip-flop 17, the first delay circuit 18' outputs a signal which rises in accordance with a time constant determined by the resistor $R_2$ and the capacitor C, and the output of the delay circuit 18' exceeds a threshold valve Vth after a lapse of time $t_r$ (FIG. 18(d)). Since the $\overline{Q}$ output of the external flip-flop 17 is delayed by a time $t_d$ by the second delay circuit 20, the output of the exclusive OR circuit 19 becomes a level "L" after lapse of time $t_r$ from the rise of the Q output of the external flip-flop 17, while the output of the second delay circuit 20 becomes a level "H" after a lapse of time $t_d$ from the rise of the Q output of the external flip-flop 17 (FIG. 18(f)).

When a pulse of the record data (FIG. 18(b)) is input again to the input terminal 3, the Q output of the external flip-flop 17 becomes a level "L" (FIG. 18(c)). The delay time of the first delay circuit 18' at this time is approximately zero because the diode D turns ON. The output of the exclusive OR circuit 19 goes down to a level "L" simultaneously with the fall of the Q output of the external flip-flop 17 and goes up to a level "H" at the same time as the output of the second delay circuit 20 becomes a level "H" (FIG. 18(f)).

In this way, the width of adjacent pulses output from the exclusive OR circuit 19 is different. This will cause the internal flip-flop 16 to reverse the state in response to the fall of the output of the exclusive OR circuit 19, and a time difference between the level "H" and level "L" periods is equal to $2 \times t_r$ (FIG. 18(g)) thereby compensating the reversal of magnetization recorded on the recording medium 9 by the above-mentioned time difference. As a result, the asymmetry produced at the time of reproduction may be reduced.

In this case, a time difference between level "H" and level "L" of periods of the output of the internal flip-flop 16, that is, a difference between the time a recording current flows through the coil X and the time a recording current flows through the coil Y when the record data have a single frequency is $2 \times t_r$ whereby the same advantages as those provided by the third embodiment shown in FIG. 14 may be obtained.

As explained above, in a magnetic disc apparatus provided with an erasing head disposed upstream of a recording and reproducing head and with a record driver circuit which reverses a recording current in response to the rise and fall of pulses of record data, it is possible to reduce the asymmetry, thereby allowing the apparatus to be produced at a low cost as well as its reliability to be enhanced.

What is claimed is:

1. A magnetic recording and reproducing circuit comprising,
   a recording and reproducing head means including a recording coil;
   an erasing head means disposed upstream of said recording and reproducing head means and including an erasing coil;
   a flip-flop means which receives pulse-shaped record data and outputs an output signal which reverses the state in accordance with the pulses of said recording data;

a delay means which receives the output of said flip-flop means and delays such output by a predetermined period of time;

a record driver means which receives the output of said delay means for causing a recording current to flow through said recording coil of said recording and reproducing head; and an erasing means for causing an erasing current to flow through said erasing coil of said erasing head at the time of recording.

2. A magnetic recording and reproducing circuit comprising, a recording and reproducing head means for record and reproduction on a recording medium;

an erasing head means for DC erasing a track of said recording medium in a predetermined direction prior to recording;

a record driver means for causing a recording current to flow through said recording and reproducing head in response to pulse-shaped record data;

an erasing means for causing a DC current to flow through said erasing head;

a flip-flop means which sequentially reverses the state in accordance with pulses of said record data;

a delay means for delaying the rise of one of the outputs of said flip-flop means by a first time and the fall of the one of the outputs of said flip-flop means by a second time; and an exclusive OR means for providing an exclusive OR output of the output of said delay means and the other of the outputs of said flip-flop means, said exclusive OR output being input to said record driver means as compensated record data.

3. A magnetic recording and reproducing circuit comprising, a recording and reproducing head for effecting record and reproduction on a recording medium;

an erasing head means for DC erasing a track of the recording medium in a predetermined direction prior to recording;

a record driver means for causing a recording current to flow through said recording and reproducing head in accordance with record data pulses;

an erasing means for causing a DC current to flow through said erasing head;

a flip-flop means which reverses the state in accordance with the record data pulses;

a first delay means for delaying the rise of the outputs of said flip-flop means by a first time;

a second delay means for delaying the fall of one of the outputs of said flip-flop means by a second time which is different from the first time; and an exclusive OR means for providing an exclusive OR output of the output of said first and second delay means, said exclusive OR output being input to said record driver means as corrected record data pulses.

4. A magnetic recording and reproducing circuit for suppressing assymmetry in a recording and reproducing apparatus having a record head and an erase head upstream from the record head, the circuit comprising:

a flip-flop means for receiving pulse-shaped record data having means for providing an output signal which reverses state in accordance with the pulses of said record data;

a delay means for receiving the output signal of said flip-flop means and providing an output signal corresponding to the flip-flop output signal delayed by a first predetermined period of time;

means for receiving the output of said delay means and for driving said record and erase heads.

5. A magnetic recording and reproducing circuit as set forth in claim 4, wherein said delay means comprises a delay circuit including:

a resistor having first and second terminals, the first terminal receiving the flip-flop output signal, the second terminal providing an output signal for the delay circuit;

a capacitor having first and second terminals, the first terminal connected to the second terminal of the resistor, the second terminal connected to ground; and a diode connected in parallel with said resistor.

6. A magnetic recording and reproducing circuit as set forth in claim 5, wherein the delay means further comprises:

an inverter having means for receiving the delay circuit output signal and means for providing an output signal having rising edges corresponding to falling edges of the flip-flop output signal.

7. A magnetic recording and reproducing circuit as set forth in claim 6, wherein the driving means comprises:

a first npn transistor having a collector connected to a recording head, a base connected to receive the delay means output signal, and an emitter;

an inverter having means for receiving the delay means output signal and means for providing an output signal corresponding to an inverted delay means output signal;

a second npn transistor having a collector connected to a recording head and a base connected to receive the output signal of the inverter, and an emitter; and a current source connected to the emitters of both said first and second npn transistors.

8. A magnetic recording and reproducing circuit, as set forth in claim 5, wherein the delay means further comprises:

means for receiving a compensation reversal signal;

exclusive-or means for receiving as inputs the delay circuit output signal and the compensation reversal signal and for providing an output signal indicative of the exclusive-or of said inputs.

9. A magnetic recording and reproducing circuit, as set forth in claim 8, wherein said means for receiving a compensation reversal signal includes a compensation reversal circuit for controlling said flip-flop means.

10. A magnetic recording and reproducing circuit as set forth in claim 9, wherein the flip-flop means has a preset terminal and a reset terminal and the compensation reversal circuit comprises:

an inverter for receiving a compensation reversal signal and providing an inverted compensation reversal signal;

a first or means for receiving a write signal and the inverted compensation reversal signal for providing a reset signal to the flip-flop reset terminal;

a second or means for receiving a compensation reversal signal and a write signal and for providing a preset signal to the flip-flop preset terminal.

11. A magnetic recording and reproducing circuit as set forth in claim 10, wherin said driving means comprises:
   a first npn transistor having a collector connected to a recording head, a base connected to receive the delay means output signal, and an emitter;
   an inverter having means for receiving the delay means output signal and means for providing an output signal corresponding to an inverted delay means output signal;
   a second npn transistor having a collector connected to a recording head and a base connected to receive the output signal of the inverter, and an emitter; and
   a current source connected to the emitters of both said first and second npn transistors.

12. A magnetic recording and reproducing circuit as set forth in claim 11, wherein the resistor is a variable resistor.

13. A magnetic recording and reproducing circuit as set forth in claim 4, wherein said delay means comprises a delay circuit including:
   a diode;
   a first resistor connected in series with said diode;
   a second resistor having first and second terminals and connected in parallel with said series connected first resistor and diode, the first terminal receiving the flip-flop output signal, the second terminal providing an output signal for the delay circuit; and
   a capacitor having first and second terminals, the first terminal connected to the second terminal of the resistor, the second terminal connected to ground.

14. A magnetic recording and reproducing circuit as set forth in claim 13, wherein the flip-flop means has an input, an inverting output and a non-inverting output, said delay means receives the non-inverted output, said inverting output is connected to said input, and the delay means further comprises:
   an exclusive-or means having means for receiving the delay circuit output signal, means for receiving the flip-flop means inverted output and means for providing an output signal to said driving means.

15. A magnetic recording and reproducing circuit as set forth in claim 14, wherein the driving means comprises:
   a flip-flop means having means for receiving the delay means output signal, an input means and means for providing an inverted output signal and a non-inverted output signal, each output signal changing state according to a change in state of said delay means output signal, said inverted output signal being received by said input means;
   a first npn transistor having a collector connected to the record head, a base connected to receive the inverted output signal, and an emitter;
   a second npn transistor having a collector connected to the record head and a base connected to receive the non-inverted output signal, and an emitter; and
   a current source connected to the emitters of both said first and second npn transistors.

16. A magnetic recording an reproducing circuit as set forth in claim 4, wherein the flip-flop means has an input, an inverting output and a non-inverting output, said delay means receives the non-inverted output, said inverting output is connected to said input, and the delay means further comprises:
   an exclusive-or means having means for receiving the delayed flip-flop output signal, means for receiving the flip-flop means inverted output and means for providing as the delay means output signal to said driving means the exclusive-or of the delayed flip-flop output signal and the flip-flop means inverted output.

17. A magnetic recording an reproducing circuit as set forth in claim 16, wherein the means for receiving the flip-flop means inverted output includes a second delay means for delaying the fall of the flip-flop means inverted output by a second predetermined time which is different from said first predetermined time.

18. A magnetic recording and reproducing circuit as set forth in claim 17, wherein the driving means comprises:
   a flip-flop means having means for receiving the delay means output signal, an input means and means for providing an inverted output signal and a non-inverted output signal, each output signal changing state according to a change in state of said delay means output signal, said inverted output signal being received by said input means;
   a first npn transistor having a collector connected to the record head, a base connected to receive the inverted output signal, and an emitter;
   a second npn transistor having a collector connected to the record head and a base connected to receive the non-inverted output signal, and an emitter; and
   a current source connected to the emitters of both said first and second npn transistors.

19. A magnetic recording and reproducing circuit as set forth in any of claims 4 to 18, wherein the circuit is embodied in an integrated circuit.

* * * * *